(12) United States Patent
Lee et al.

(10) Patent No.: US 8,284,763 B2
(45) Date of Patent: Oct. 9, 2012

(54) VOICE OVER INTERNET PROTOCOL GATEWAY AND A METHOD FOR CONTROLLING THE SAME

(75) Inventors: Dae-Hyun Lee, Suwon-shi (KR); Jung-Gi Kim, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1171 days.

(21) Appl. No.: 12/149,743

(22) Filed: May 7, 2008

(65) Prior Publication Data
US 2008/0285547 A1 Nov. 20, 2008

Related U.S. Application Data

(62) Division of application No. 10/150,071, filed on May 20, 2002, now Pat. No. 7,376,124.

(30) Foreign Application Priority Data

May 26, 2001 (KR) .................................. 2001-29286
Nov. 8, 2001 (KR) .................................. 2001-69603

(51) Int. Cl.
*H04L 12/66* (2006.01)
(52) U.S. Cl. ........................................ 370/352; 370/401
(58) Field of Classification Search .................... None
See application file for complete search history.

(56) References Cited

U.S. PATENT DOCUMENTS

| | | | | |
|---|---|---|---|---|
| 4,796,292 A | 1/1989 | Thomas | ...................... | 379/91.01 |
| 5,757,894 A | 5/1998 | Kay et al. | ................. | 379/127.03 |
| 5,991,310 A | 11/1999 | Katko | | |
| 6,363,080 B1 | 3/2002 | Katko | ........................... | 370/466 |
| 6,515,984 B1 | 2/2003 | Arimilli et al. | ............... | 370/352 |
| 6,584,108 B1 | 6/2003 | Chung et al. | ................... | 370/401 |
| 6,760,324 B1 * | 7/2004 | Scott et al. | ..................... | 370/352 |

FOREIGN PATENT DOCUMENTS

| | | |
|---|---|---|
| EP | 1071246 A2 | 1/2001 |
| KR | 2002001940 A | 1/2002 |

OTHER PUBLICATIONS

Telephony Signaling (Understanding Foreign Exchange Station (FXS) Voice Interface Cards, Nov. 18, 2002.
Cisco 3600 Series Multiservice Platforms (Understanding Foreign Exchange Office (FXO) Voice Interface Cards, Nov. 18, 2002.
RT 201V: VoIP Gateway Basic Unit with 2 slots for 8 Voice ports, Nov. 20, 2002.
Bur Goode, "*Voice Over Internet Protocol (VoIP)*", IEEE, vol. 90, No. 9. pp. 1495-1517, Sep. 2002.

* cited by examiner

*Primary Examiner* — Asad M Nawaz
*Assistant Examiner* — Justin N Mullen
(74) *Attorney, Agent, or Firm* — H.C. Park & Associates, PLC

(57) ABSTRACT

A voice over Internet protocol (VoIP) gateway includes a foreign exchange office (FXO), a foreign exchange station (FXS), and a VoIP processor. A controller of the VoIP gateway sets the VoIP gateway to either a TANDEM (trunk and ENM (ear and mouth)) mode or a standalone mode. In the TANDEM mode, the VoIP gateway transmits an incoming call from the VoIP processor to the FXO and an outgoing call from the FXS to the VoIP processor. In the standalone mode, the VoIP gateway transmits the incoming call from the VoIP processor to the FXS and the outgoing call from the FXS to the VoIP.

14 Claims, 7 Drawing Sheets

| ACCESS CODE | ACCESS CODE LENGTH | ACCESS CODE DELETION LENGTH | INSERT DIGIT | IP TABLE |
|---|---|---|---|---|
| 1000 | 4 | 4 | 201 | 0 → 168.219.80.100 |
| 1001 | 4 | 4 | 202 | 0 |
| ... | | ... | ... | ... |
| 1099 | 4 | 4 | 208 | 0 → 168.219.79.140 |
| 1100 | 4 | 4 | 201 | 1 |
| 1101 | 4 | 4 | 202 | 1 |
| ... | | ... | ... | ... |
| 1199 | 4 | 4 | 208 | 1 |

FIG.6

VOICE OVER INTERNET PROTOCOL GATEWAY AND A METHOD FOR CONTROLLING THE SAME

CLAIM OF PRIORITY AND CROSS-REFERENCE TO RELATED APPLICATION

This application makes reference to, incorporates the same herein, and claims all benefits accruing under 35 U.S.C. §119 from the application entitled VOICE OVER INTERNET PROTOCOL GATEWAY AND A METHOD FOR CONTROLLING THE SAME" filed in the Korean Industrial Property Office on May 26, 2001 and there duly assigned Serial No. 2001-29286, and the application entitled VOICE OVER INTERNET PROTOCOL GATEWAY AND A METHOD FOR CONTROLLING THE SAME filed in the Korean Industrial Property Office on Nov. 8, 2001 and there duly assigned Serial No. 2001-69603. Furthermore, this application is a divisional of application Ser. No. 10/150,071 filed in the U.S. Patent & Trademark Office on 20 May 2002, issued on 20 May 2008 as U.S. Pat. No. 7,376,124, and assigned to the assignee of the present invention.

BACKGROUND OF THE INVENTION

1. Technical Field

The present invention relates generally to a voice over Internet protocol (VoIP) gateway system and, in particular, to a VoIP gateway for supporting a VoIP call of a legacy private branch exchange (PBX) or a key phone system that has only a foreign exchange office (FXO), and to a method for controlling the same.

2. Related Art

A voice over Internet protocol (VoIP) gateway system transmits voice and facsimile data received from a public switched telephone network (PSTN) to an Internet protocol (IP) network after real time compression and protocol conversion. Also, a VoIP board built into the VoIP gateway system converts audio data used by the PSTN into data used in the IP network. That is, the VoIP board with a VoIP gateway function of enabling a telephone call over the Internet supports the H.323 V3 protocol.

A foreign exchange office (FXO), typically implemented in the form of a board, provides an office line interface for an exchange. A foreign exchange station (FXS), also implemented in the form of a board, provides an extension line interface. A VoIP processor, also implemented in the form of a board, converts the audio data received from the PSTN into data used in the IP network. A controller in the form of a media gateway control board (MGCB) controls the FXO, the FXS, and the VoIP processor, thereby totally controlling the entire operation of the VoIP gateway (VG).

The VoIP gateway, developed to form the VoIP network, is interlocked with a digital interface (E1/T1) or an analog interface (FXO, FXS, or E&M) of a legacy private branch exchange (PBX) or a key phone system. The E1/T1, a board mounted on the controller, is used when the VoIP gateway is connected to an extension line E1 or T1. The E1 and the T1 are well-known high-speed digital lines supporting transmission rates of 2.048 Mbps and 1.544 Mbps, respectively. While the E1/T1 or E&M provides a bi-directional service for supporting both transmission and reception functions, the FXS and the FXO supporting a unidirectional service have limitations in providing services. That is, when it is assumed that each of the FXS and the FXO can provide an eight-port service because the number of incoming calls is eight and the number of outgoing calls is eight, a total of 16 channels are supported. However, the number of channels that can serve the outgoing calls is restricted to eight. That is, it is not possible to use all of the 16 channels for the outgoing calls. Also, when the legacy PBX or the key phone system that has only an FXO is used according to the state of a site, the legacy PBX or the key phone system must be expanded or exchanged in order to manage the VoIP network using the above interfaces.

A VoIP network includes a common legacy PBX or key phone system that has an FXO and an FXS. The E1/T1 digital interface (or trunk) supporting both the transmission and reception functions or the E&M analog interface is used to establish the VoIP network interlocked with the legacy PBX or the key phone system using the VoIP gateway. In the case of an interface using an FXS and an FXO, the FXS supports a reception function, while the FXO supports a transmission function. Therefore, the legacy PBX or the key phone system that has both the FXS and the FXO is connected to the FXO and the FXS of the VoIP gateway to perform a VoIP service.

However, when the legacy PBX or the key phone system has only the FXO, it cannot support both transmission and reception functions. This is because the FXO and the FXS are unidirectional. For example, when a subscriber in a first region tries to transmit a call to the FXS of the VoIP gateway using the FXO of the key phone system in the VoIP network including the FXO/FXS analog interfaces, a call setup signal is converted into a VoIP packet and is transmitted to a VoIP gateway in a second region. The call transmitted to the FXO of the VoIP gateway terminates at the FXS of the legacy PBX. Therefore, if the PBX or the key phone system in the second region does not have an FXO, the transmitted call cannot terminate.

The legacy PBX and the key phone system supporting a direct inward dial (DID) numbering function can operate as if the incoming call is terminated at the FXO. However, because a VoIP gateway transfers a VoIP incoming call to the FXO, a function of transferring the VoIP incoming call to the FXS is required in order to interface with the legacy PBX and the key phone system without the FXO. Also, in order to transmit a call to an appropriate FXS of the VoIP gateway, digits received from a caller party must be translated so as to be suitable for a called party.

SUMMARY OF THE INVENTION

It is, therefore, an object of the present invention to provide a voice over Internet protocol (VoIP) gateway for supporting VoIP calls of an exchange having only a foreign exchange office (FXO), such as a legacy private branch exchange (PBX) or a key phone system, and a method for controlling the same.

To achieve the above and other objects, there is provided a voice over Internet protocol (VoIP) gateway comprising a foreign exchange office (FXO), a foreign exchange station (FXS), and a VoIP processor. A controller of the VoIP gateway sets the VoIP gateway to either a TANDEM (trunk and ENM (ear and mouth)) mode or a standalone mode. In the TANDEM mode, the VoIP gateway transmits an incoming call from the VoIP processor to the FXO and an outgoing call from the FXS to the VoIP processor. In the standalone mode, the VoIP gateway transmits the incoming call from the VoIP processor to the FXS and the outgoing call from the FXS to the VoIP.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein:

FIG. 6 is a VoIP routing table used for the present invention; and

DETAILED DESCRIPTION OF THE PREFERRED EMBODIMENT

Figure 1:
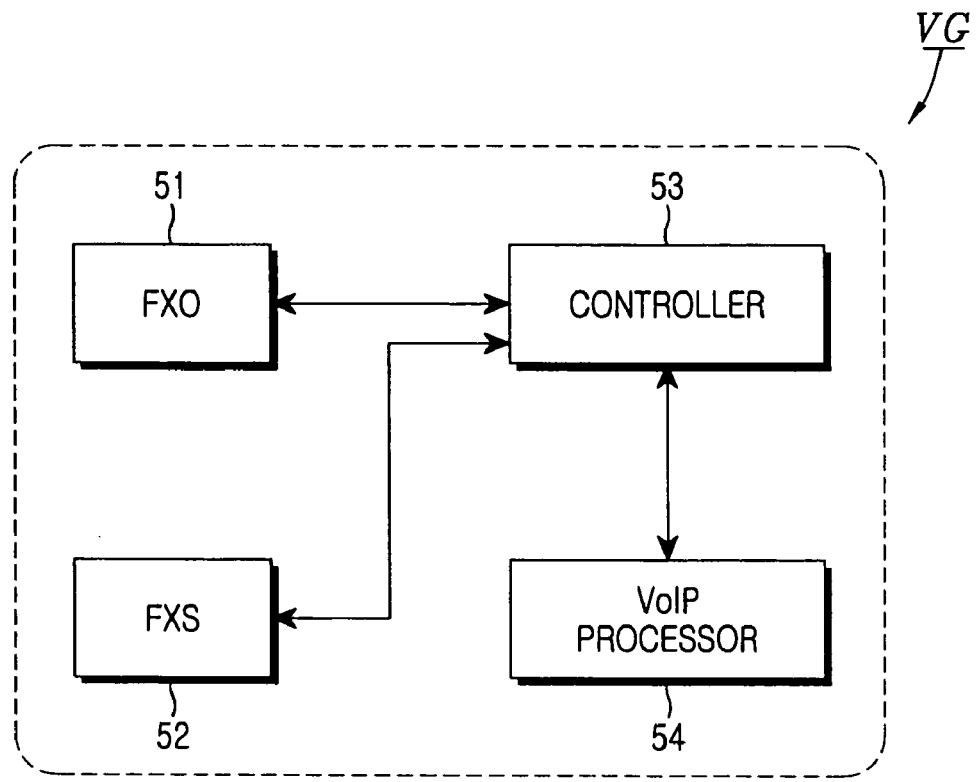
FIG. 1 is a diagram showing a schematic structure of a voice over Internet protocol (VoIP) gateway.

A preferred embodiment of the present invention will be described herein below with reference to the accompanying drawings. In the drawings, the same elements are represented by the same reference numerals.

FIG. 1 is a diagram showing a schematic structure of the VoIP gateway. A foreign exchange office (FXO) 51, typically implemented in the form of a board, provides an office line interface for an exchange. A foreign exchange station (FXS) 52, also implemented in the form of a board, provides an extension line interface. A VoIP processor 54, also implemented in the form of a board, converts audio data received from the PSTN into data used in the IP network. A controller 53 in the form of a media gateway control board (MGCB) controls the FXO 51, the FXS 52, and the VoIP processor 54, thereby totally controlling the entire operation of the VoIP gateway (VG).

The VoIP gateway, developed to form the VoIP network, is interlocked with a digital interface (E1/T1) or an analog interface (FXO, FXS, or E&M) of a legacy private branch exchange (PBX) or a key phone system. The E1/T1, a board mounted on the controller 53, is used when the VoIP gateway is connected to an extension line E1 or T1. The E1 and the T1 are well-known high-speed digital lines supporting transmission rates of 2.048 Mbps and 1.544 Mbps, respectively. While the E1/T1 or E&M provides a bi-directional service for supporting both transmission and reception functions, the FXS and the FXO supporting a unidirectional service have limitations in providing services. That is, when it is assumed that each of the FXS and the FXO can provide an eight-port service because the number of incoming calls is eight and the number of outgoing calls is eight, a total of 16 channels are supported. However, the number of channels that can serve the outgoing calls is restricted to eight. That is, it is not possible to use all of the 16 channels for the outgoing calls. Also, when the legacy PBX or the key phone system that has only an FXO is used according to the state of a site, the legacy PBX or the key phone system must be expanded or exchanged in order to manage the VoIP network using the above interfaces.

Figure 2:
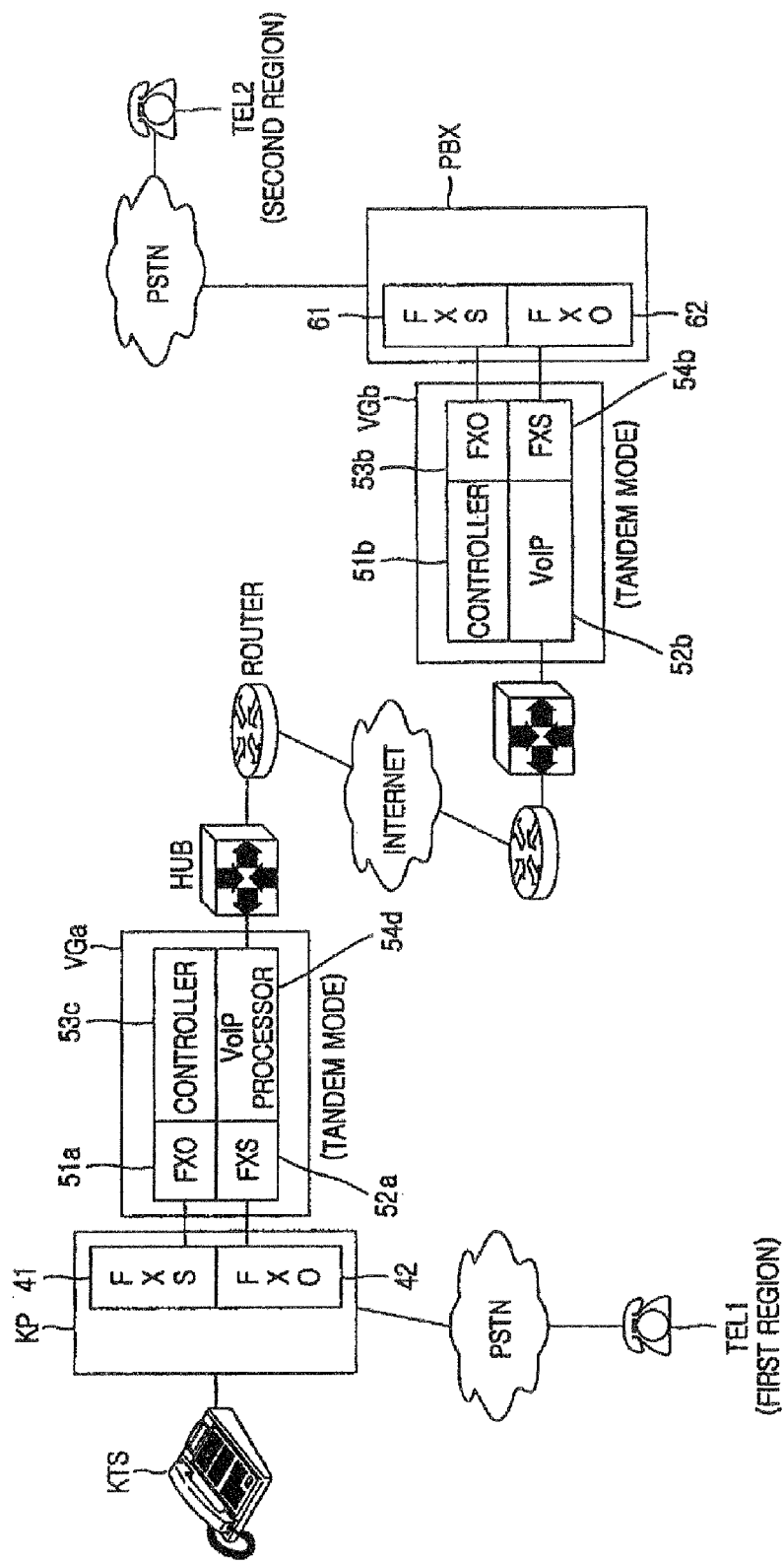
FIG. 2 is a diagram showing the structure of a VoIP network using a foreign exchange office (FXO) and a foreign exchange station (FXS)

FIG. 2 is a diagram showing a VoIP network including a common legacy PBX which has an FXO 62 and an FXS 61, and a key phone system KP which is connected to a key telephone set KTS, and which has an FXO 42 and an FXS 41. The E1/T1 digital interface (or trunk) supporting both the transmission and reception functions or the E&M analog interface is used to establish the VoIP network interlocked with the legacy PBX or the key phone system KP using the VoIP gateway VGb or the VoIP gateway VGa. In the case of an interface using an FXS and an FXO, the FXS supports a reception function, while the FXO supports a transmission function. Therefore, the key phone system KP that has both the FXS 41 and the FXO 42 is connected to the FXO 51a (which is, in turn, connected to controller 53c) and the FXS 52a of the VoIP gateway VGa as shown in FIG. 2, while the legacy PBX that has both the FXS 61 and the FXO 62 is connected to the FXO 53b and the FXS 54b (which is, in turn, connected to a VoIP processor 52b) of the VoIP gateway VGb, thereby performing a VoIP service.

However, when the legacy PBX or the key phone system KP has only an FXO, it cannot support both transmission and reception functions. This is because the FXO 51a and 53b and the FXS 52a and 54b are unidirectional. For example, when a subscriber TEL1 in a first region tries to transmit a call to the FXS 52a of the VoIP gateway VGa using the FXO 42 of the key phone system KP in the VoIP network including the FXO/FXS analog interfaces, a call setup signal is converted into a VoIP packet by VoIP processor 54d and is transmitted to a VoIP gateway VGb in a second region. The call transmitted to the FXO 53b via controller 51b of the VoIP gateway VGb terminates at the FXS 61 of the legacy PBX. Therefore, if the legacy PBX in the second region does not have an FXS, or if the VoIP gateway VGb in the second region does not have an FXO, the transmitted call cannot terminate.

A legacy PBX supporting a direct inward dial (DID) numbering function can operate as if the incoming call is terminated at the FXO 62. However, because a VoIP gateway VGb transfers a VoIP incoming call to the FXO 53b, a function of transferring the VoIP incoming call to the FXS 54b is required in order to interface with the legacy PBX without the FXS 61. When a subscriber TEL2 tries to transmit a call, a key phone system in which the FXS 41 is not mounted can operate as if the incoming call is terminated at FXS 52a. Also, in order to transmit a call to an appropriate FXS of the VoIP gateway, digits received from a caller party TEL1 must be translated so as to be suitable for a called party TEL2.

A voice over Internet protocol (VoIP) gateway according to an embodiment of the present invention has the same structure as shown in FIG. 1. However, the detailed operation wherein controller 53 controls foreign exchange office (FXO) 51, foreign exchange station (FXS) 52, and VoIP processor 54 is different. This is the core of the present invention.

The VoIP gateway according to the embodiment of the present invention can be used in a standalone mode as well as in a well-known TANDEM (trunk and ENM (ear and mouth)) mode. That is, the VoIP gateway can be used in either the standalone mode or in the TANDEM mode. The two modes are set in response to an external command by a user. The standalone mode is defined to support the VoIP call of a legacy private branch exchange (PBX) or a key phone system that has only an FXO.

Figure 3:
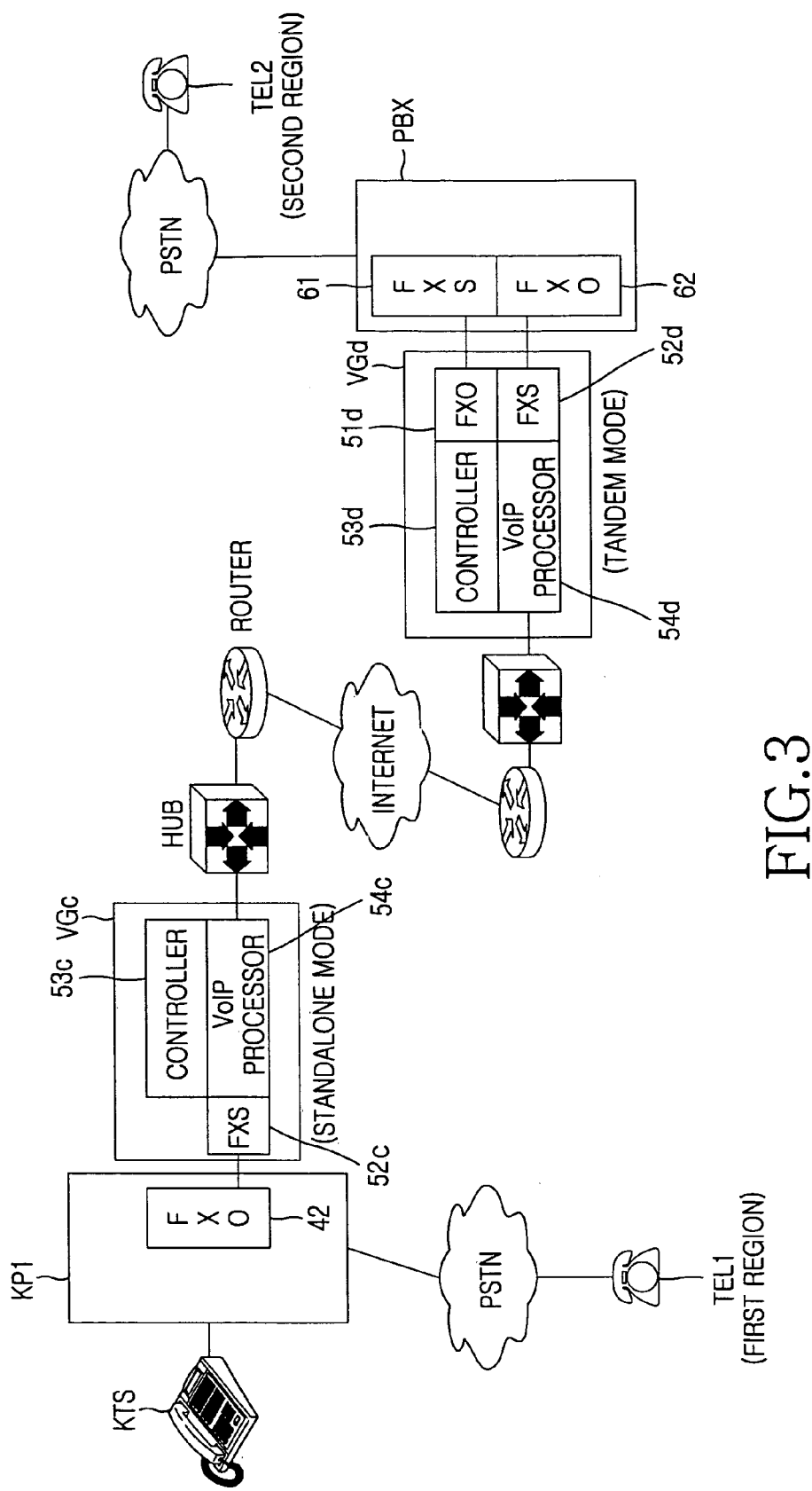
FIG. 3 is a diagram showing a first exemplary structure of a VoIP network using a key phone system or a legacy private branch exchange (PBX) that has only the FXO, to which the present invention is applied.

FIG. 3 is a diagram showing a first exemplary structure of a VoIP network using a key phone system KP1 that has only an FXO, to which the present invention is applied.

As shown in FIG. 3, in a key phone system KP1 that has only an FXO 42, the FXO 42 is connected to an FXS 52c of a VoIP gateway VGc, which is different from the common VoIP gateway connection method. Therefore, in order to transfer a call originated by a subscriber telephone TEL2 in a second region to the FXS 52c of the VoIP gateway VGc in a first region so as to transmit it to the key phone system KP1, the mode of the VoIP gateway VGc in the first region must be set so as to be different from the mode of the VoIP gateway VGd in the second region. That is, the VoIP gateway VGd in the second region must be set to a TANDEM mode and the VoIP gateway VGc in the first region must be set to the standalone mode.

In the TANDEM mode, an incoming call is transmitted from a VoIP processor 54d to the FXO 51d (E1/T1 or E&M), which is also connected to controller 53d, and an outgoing call is transmitted from the FXS 52d to the VoIP processor 54d. To be specific, when the subscriber telephone TEL2 in the second region tries to set up a call, the call is connected to an FXS 52d of the VoIP gateway VGd through an FXO 62 of the legacy PBX. The call is converted into a VoIP call and reaches the VoIP gateway VGc in the first region through the network. At this time, the VoIP gateway VGc in the first region is in the standalone mode.

The VoIP gateway VGc in the first region transmits an incoming VoIP call from VoIP processor 54c to the FXS 52c, and then to the FXO 42 of the key phone system KP1, so that a VoIP call between the subscribers in the first and second regions TEL1 and TEL2, respectively, can be set up. In order to transfer the incoming VoIP call to the FXS 52c of the VoIP gateway VGc, the incoming VoIP call must be terminated at the designated number of the FXS (a corresponding extension number). Therefore, digit translation for transmitting a call from the VoIP gateway VGd in the second region to the FXS 52c of the VoIP gateway VGc in the first region is performed. This is because the specific FXS number of the VoIP gateway VGc in the first region is different from the actual subscriber number of the key phone system KP1.

Figure 4:
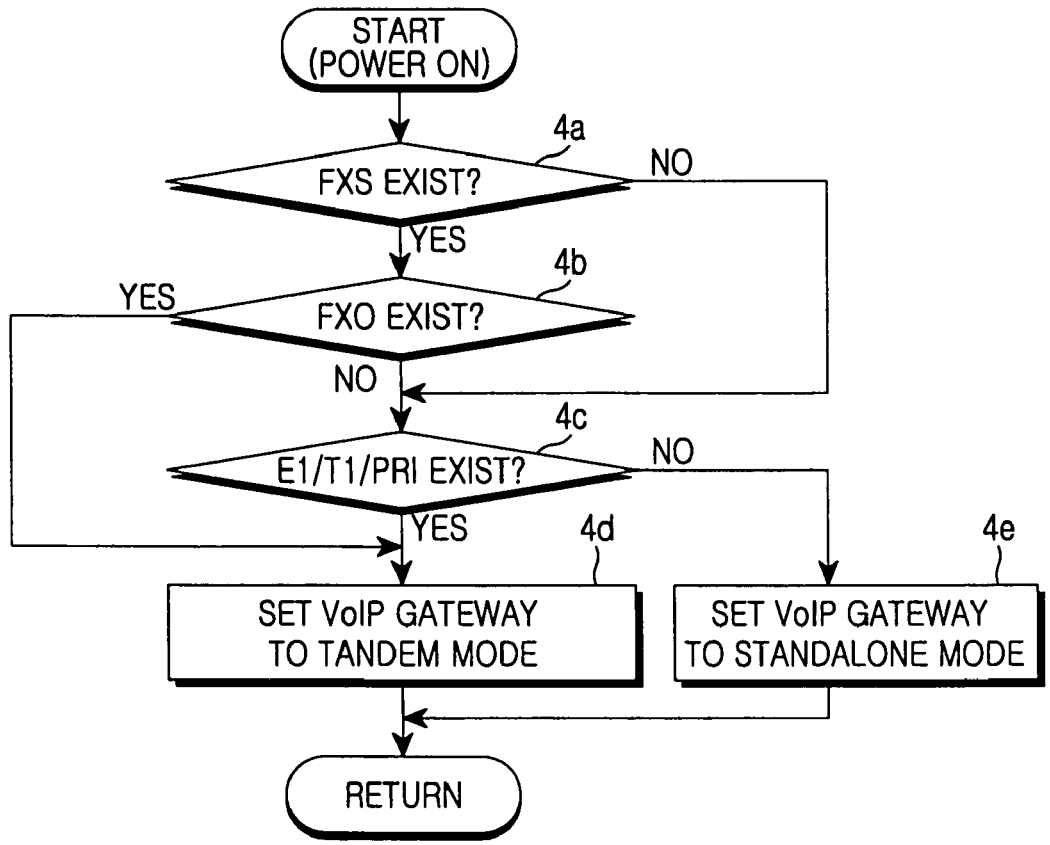
FIG. 4 is a flowchart showing a mode setting procedure of a VoIP gateway according to an embodiment of the present invention.

FIG. 4 is a flowchart showing a mode setting procedure of a VoIP gateway according to an embodiment of the present invention. Referring to FIG. 4, a controller 53c performs an initialization upon power-on or re-booting of the key phone system. Thereafter, in steps 4a thru 4c, the controller 53c checks whether cards (boards) exist, and sets the VoIP gateway VGc to the TANDEM mode or the standalone mode according to the results of the check. To be specific, controller 53c determines whether the FXS exists in step 4a. When the FXS exists, controller 53c determines whether the FXO exists in step 4b. When the FXO exists, the VoIP gateway VGc is set to the TANDEM mode in step 4d. When it is determined in step 4b that the FXO does not exist, controller 53c determines in step 4c whether E1/T1/PRI exists. When the E1/T1/PRI exists, the VoIP gateway VGc is set to the TANDEM mode in step 4d. When the E1/T1/PRI does not exist, the VoIP gateway VGc is set to the standalone mode in step 4e.

In the case of the VoIP gateway VGc shown in FIG. 3, because the key phone system KP1 has only the FXO 42, it requires only the FXS 52c. Therefore, an FXO or an E1/T1/PRI is not included. Accordingly, the VoIP gateway VGc is set to the standalone mode in the mode setting step.

However, in the case of the VoIP gateway VGd, because the legacy PBX has both an FXS 61 and an FXO 62, the VoIP gateway VGd must include an FXO 51d and an FXS 52d. Therefore, the VoIP gateway VGd is set to the TANDEM mode in the mode setting step.

Figure 5:
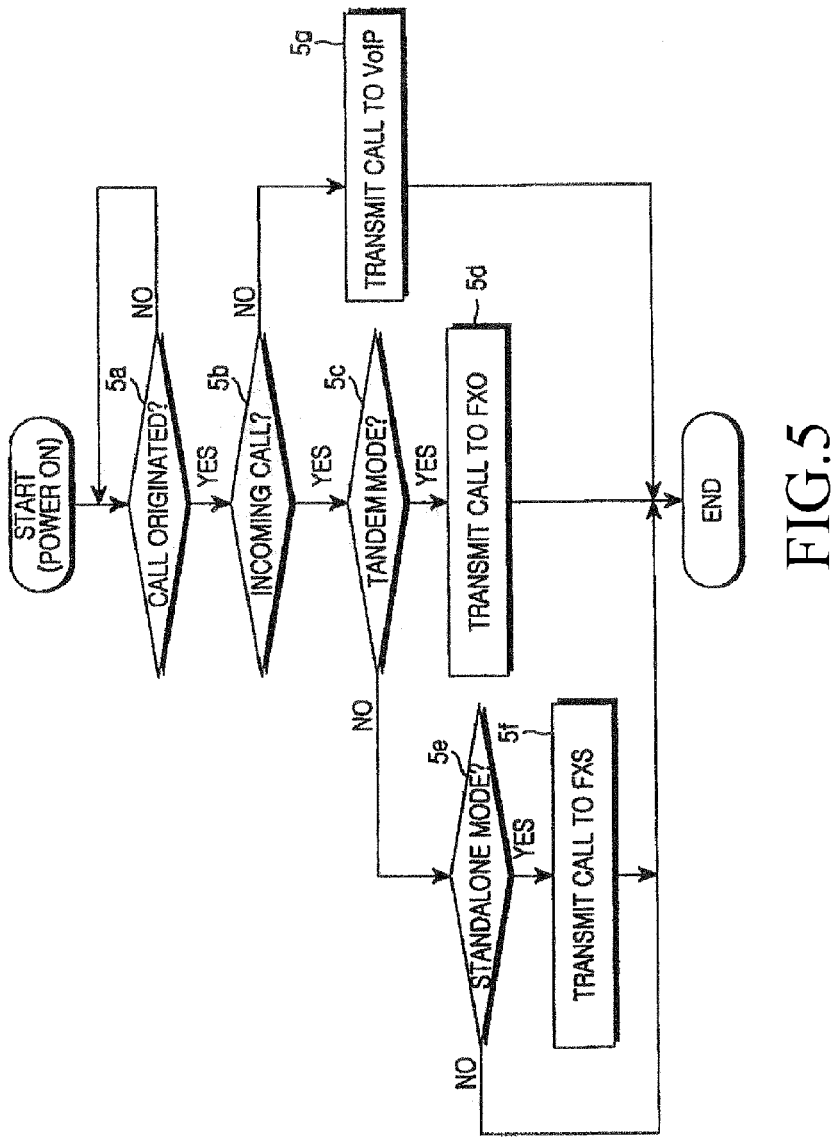
FIG. 5 is a flowchart showing a control operation of the VoIP gateway according to the embodiment of the present invention.

FIG. 5 is a flowchart showing a control operation of the VoIP gateway according to an embodiment of the present invention. A description will be made of an operation of the VoIP gateway when it is set to the standalone mode. For the sake of convenience, it is assumed that the VoIP gateway VGc of FIG. 3 operates in this way. In the case of the incoming call, the VoIP gateway VGc operates in the order of step 5a→step 5b→step 5c→step 5e→step 5f.

When an arbitrary call is originated, the controller 53c of the VoIP gateway VGc senses the call in step 5a. The controller 53c checks whether the originated call is an incoming call in step 5b. As shown in FIG. 3, the incoming call is transmitted from the counterpart subscriber telephone TEL2 and is received through a public switched telephone network (PSTN), the legacy PBX and a VoIP processor 54d of the VoIP gateway VGd.

When it is determined that the originated call is an incoming call, the controller 53c checks in step 5c as to whether the VoIP gateway VGc is set to the TANDEM mode. When it is determined that the VoIP gateway VGc is not set to the TANDEM mode, the controller 53c determines in step 5e whether the VoIP gateway VGc is set to the standalone mode. When it is determined that the VoIP gateway VGc is set to the standalone mode, the process proceeds to step 5f where the controller 53c transmits the call received through a VoIP processor 54c to the FXS 52c. The call output to the FXS 52c is transmitted to a key telephone set (KTS).

In the case of an outgoing call, the VoIP gateway VGc operates in the order of step 5a→step 5b→step 5g. When it is determined in step 5b that the originated call is not an incoming call because the call is an outgoing call transmitted from the key phone KP1 to the FXS 52c, the process proceeds to step 5g where the controller 53c transmits the outgoing call to the Internet network through the VoIP processor 54c.

Next, a description will be provided for an operation of the VoIP gateway when it is set to the TANDEM mode. The two gateways, VoIP gateways VGa and VGb of FIG. 2, and the VoIP gateway VGd of FIG. 3 operate in this way. In the case of an incoming call, the VoIP gateways VGa, VGb, and VGd operate in the order of step 5a→step 5b→step 5c→step 5d. In the case of an outgoing call, the VoIP gateways VGa, VGb, and VGd operate in the order of step 5a→step 5b→step 5g as when the VoIP gateway is in the standalone mode.

FIG. 6 is a VoIP routing table used for the present invention. The VoIP routing table of FIG. 6 is required to translate digits for call termination to the FXS 52c of the VoIP gateway VGc connected to the key phone system KP1 that has only an FXO in the VoIP network of FIG. 3.

Figure 7:
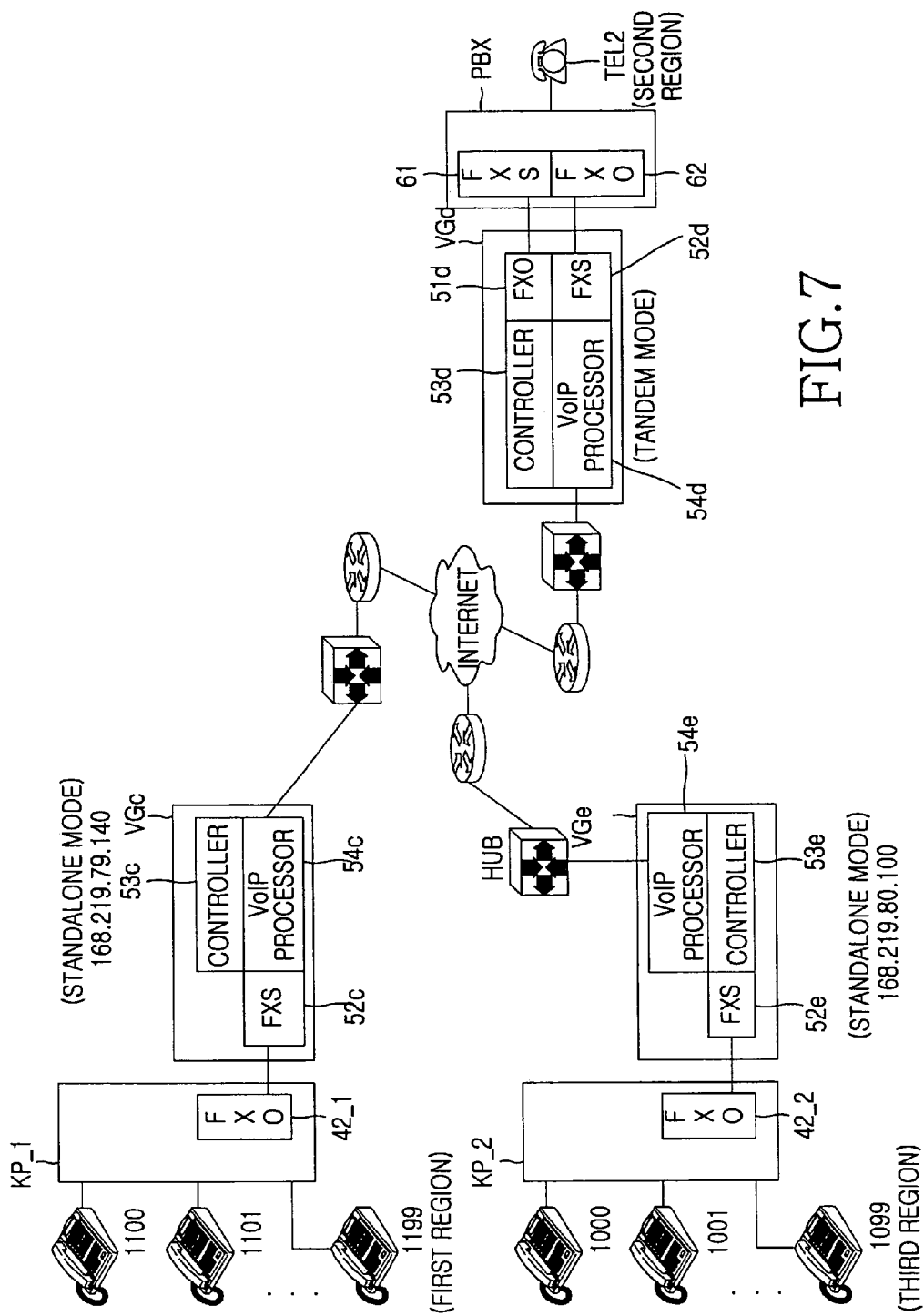
FIG. 7 is a diagram showing a second exemplary structure of a VoIP network using a key phone system or a legacy private branch exchange (PBX) that has only the FXO, to which the present invention is applied.

FIG. 7 is a diagram showing a second exemplary structure of the VoIP network using the key phone system or the legacy PBX that has only the FXO, to which the present invention is applied.

Referring to FIG. 7, the number of subscribers belonging to one region (gateway) is eight. Each of the subscribers has one of the extension numbers from 201 to 208. Although subscribers in different regions have the same extension number, the regions to which the respective subscribers belong are identified by IP tables (see FIG. 6). In the embodiment of the present invention, all of the IP tables of subscribers 1100 thru 1199 in the first region are 1, and the real address of the IP tables is 168.219.79.140. The IP tables of subscribers 1000 through 1099 in the third region are all 0, and the real address of the IP tables is 168.219.80.100.

As shown in FIG. 7, key phone systems KP_1 and KP_2 that have only an FXO 42_1 and an FXO 42_2, respectively, are connected to VoIP gateways VGc and VGe, respectively, which are in the standalone mode. The VoIP gateway VGc has an FXS 52c, a controller 53c and a VoIP processor 54c, while the VoIP gateway VGe has an FXS 52e, a controller 53e and a VoIP processor 54e. When the subscriber TEL2 in the second region tries to call the subscriber in the first region, the telephone number of the subscriber in the first region is one of 1100, 1101, . . . and 1199. Because the key phone system KP_1 has only FXO 42_1, the key phone system KP_1 must interface with the FXS 52c of the VoIP gateway VGc in the first region. Therefore, in order to terminate the incoming VoIP call at the FXS 52c without bypassing the incoming VoIP call to the FXO (not shown) of the VoIP gateway VGc in the first region, the mode of the VoIP gateway VGc is switched to the standalone mode.

Referring to FIG. 6, because the FXS numbers of the VoIP gateway VGc operating in the standalone mode are 201, 202, . . . and 208 (in the case of an eight-port FXS), the telephone number (the digits) transmitted by the subscriber telephone TEL2 in the second region must be translated into the FXS numbers so that the VoIP gateway VGc can transmit a call to the FXS 52c. In order to perform such a job, the VoIP gateway VGd in the second region translates the telephone numbers 1100, 1101, . . . and 1199 received by the caller into corresponding ones of the extension numbers 201, 202, . . . and 208 of the FXS 52c as shown in FIG. 6.

In the case of an office whose headquarters exists in the second region and whose branches exist in the first region and the third region, when the subscriber telephone number of the first region does not overlap the subscriber telephone number of the third region, it is possible to effectively translate the E.164 into the IP address according to the respective access codes as shown in FIG. 6 using the VoIP routing table in the VoIP gateway in the second region when a subscriber in the second region tries to set up a call with respect to a subscriber in the first region or the third region.

In FIG. 6, when a subscriber in the third region or the first region tries to set up a call with respect to a subscriber in the second region, in the case of the subscriber TEL2 in the second region, the VoIP gateway VGd is connected to the legacy PBX that has both FXS 61 and FXO 62. Therefore, the VoIP gateway VGd operates in the TANDEM mode. Accordingly, digit translation is not necessary.

As mentioned above, according to the present invention, the VoIP gateway can be used in the TANDEM mode or in the standalone mode as needed. Therefore, it is possible to easily realize the VoIP gateway system. That is, in the case of using a key phone system KP_1 or KP_2 that supports only the FXO, it is possible to support the FXS interface without additional equipment by setting the VoIP gateway VGc or VGe to the standalone mode. Accordingly, it is possible to improve efficiency of the VoIP gateway system and to reduce expenses.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

What is claimed is:

1. A method for routing a call in a system comprising a first voice over Internet protocol (VoIP) gateway connected to a first exchange comprising a first foreign exchange office (FXO), the first VoIP gateway comprising a first foreign exchange station (FXS), and a second VoIP gateway connected to a second exchange comprising a FXO and a FXS, the second VoIP gateway comprising a second FXO and a second FXS, the method comprising:

transmitting, by the second exchange, a call to the second VoIP gateway through the FXO of the second exchange in response to the call being set up;

transmitting, by the second VoIP gateway, the call to the first VoIP gateway in response to receiving the call; and transmitting, by the first VoIP gateway, the call to the first FXO of the first exchange in response to receiving the call, wherein the first exchange comprises no foreign exchange station.

2. The method of claim 1, further comprising setting the first VoIP gateway to a standalone mode.

3. The method of claim 1, further comprising setting the second VoIP gateway to a trunk and ear and mouth (TANDEM) mode in response to the second VoIP gateway being connected to the second exchange comprising the FXO and the FXS.

4. The method of claim 1, wherein transmitting, by the second VoIP gateway, the call to the first VoIP gateway comprises:

translating, by the second VoIP gateway, digits of the call into digits related to the first FXS of the first VoIP gateway in response to receiving the call; and transmitting, by the second VoIP gateway, the call to the first FXS of the first VoIP gateway.

5. The method of claim 4, wherein the translating is performed based on a routing table having at least access code information, insert digits, and Internet protocol information.

6. The method of claim 1, wherein transmitting, by the first VoIP gateway, the call to the first FXO comprises:

transmitting, by the first VoIP gateway, the call to the first FXS of the first VoIP gateway in response to receiving the call; and transmitting, by the first FXS of the first VoIP gateway, the call to the first FXO of the first exchange in response to receiving the call.

7. The method of claim 1, wherein the first exchange comprises a key phone system and the second exchange comprises a legacy Private Branch Exchange (PBX).

8. A call routing system comprising:

a first exchange comprising a first foreign exchange office (FXO) and no foreign exchange station;

a first voice over Internet protocol (VoIP) gateway connected to the first exchange, comprising a first foreign exchange station (FXS);

a second exchange comprising a FXO and a FXS; and a second VoIP gateway connected to the second exchange, comprising a second FXO and a second FXS, wherein the second exchange transmits a call to the second VoIP gateway through the FXO of the second exchange in response to the call being set up, the second VoIP gateway transmits the call to the first VoIP gateway in response to receiving the call, and the first VoIP gateway transmits the call to the first FXO of the first exchange in response to receiving the call.

9. The call routing system of claim 8, wherein the first VoIP gateway is set to a standalone mode.

10. The call routing system of claim 8, wherein the second VoIP gateway is set to a trunk and ear and mouth (TANDEM) mode in response to the second VoIP gateway being connected to the second exchange comprising the FXO and the FXS.

11. The call routing system of claim 8, wherein the second VoIP gateway performs translating digits of the call into digits related to the first FXS of the first VoIP gateway in response to receiving the call, and transmits the call to the first FXS of the first VoIP gateway.

12. The call routing system of claim 11, wherein the translating is performed based on a routing table having at least access code information, insert digits, and Internet protocol information.

13. The call routing system of claim 8, wherein the first VoIP gateway transmits the call to the first FXS of the first VoIP gateway in response to receiving the call, and the first FXS of the first VoIP gateway transmits the call to the first FXO of the first exchange in response to receiving the call.

14. The call routing system of claim 8, wherein the first exchange comprises a key phone system and the second exchange comprises a legacy Private Branch Exchange (PBX).

* * * * *